J. F. DIETRICH.
CASEIN DRYING APPARATUS.
APPLICATION FILED AUG. 6, 1918.
1,313,939.
Patented Aug. 26, 1919.
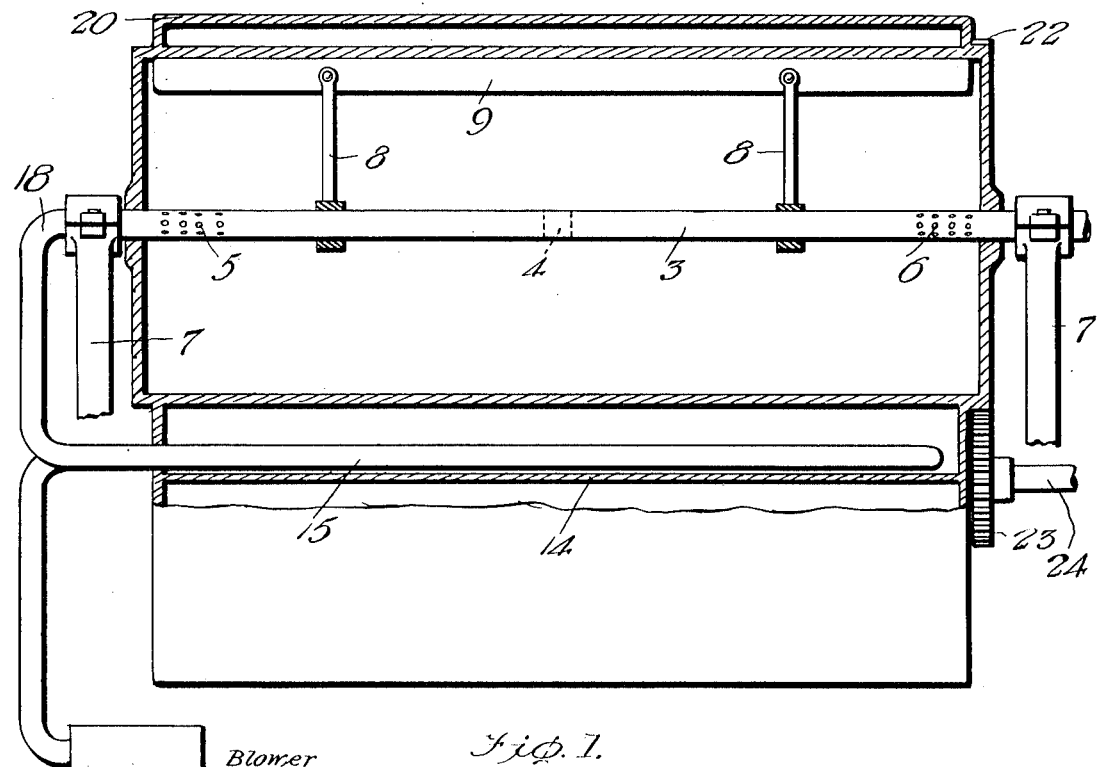
Fig. 1.
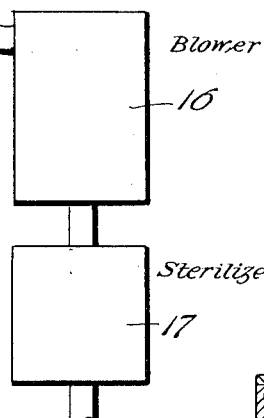
Fig. 2.
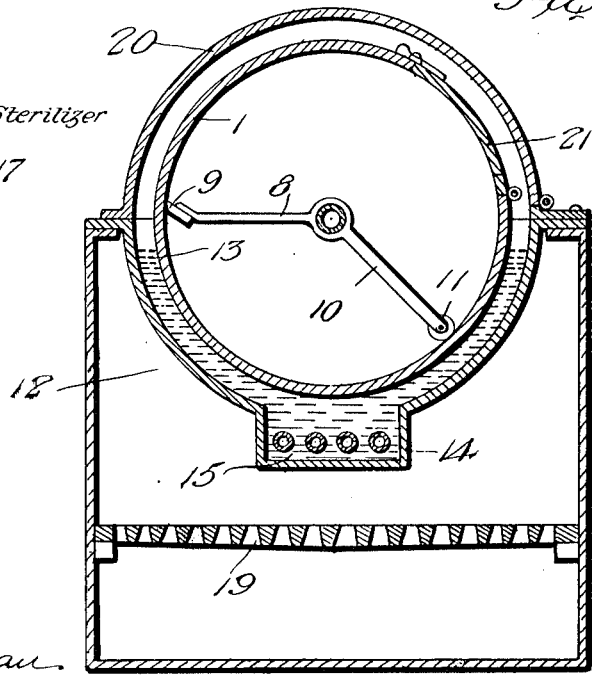
WITNESSES
INVENTOR
J. F. Dietrich,
BY
ATTORNEYS

UNITED STATES PATENT OFFICE.

JULIUS FERDINAND DIETRICH, OF KENNEWICK, WASHINGTON.

CASEIN-DRYING APPARATUS.

1,313,939.  Specification of Letters Patent.  Patented Aug. 26, 1919.

Application filed August 6, 1918. Serial No. 248,662.

*To all whom it may concern:*

Be it known that I, JULIUS FERDINAND DIETRICH, a citizen of the United States, and a resident of Kennewick, in the county of Benton and State of Washington, have invented certain new and useful Improvements in Casein-Drying Apparatus, of which the following is a specification.

My invention relates to improvements in drying apparatus for preparing casein, and it consists in the combinations, constructions and arrangements herein described and claimed.

An object of my invention is to provide a simple form of apparatus for removing the moisture from casein, which insures a uniform product.

A further object of my invention is to provide a device of the type described having means for preventing the burning of the casein during the drying process.

A further object of my invention is to provide a device by means of which the casein may be dried quickly and thoroughly, due to the fact that it is subjected to a current of warm sterilized air during the drying process, thus rapidly effecting the extraction of the moisture without in any way endangering the quality of the product.

Other objects and advantages will appear in the following specification and the novel features of the invention will be particularly pointed out in the appended claims.

My invention is illustrated in the accompanying drawings forming part of this application, in which, Figure 1 is a side view showing the general arrangement of the apparatus, Fig. 2 is a vertical section through the drying drum.

In carrying out my invention I provide a hollow drum or receptacle 1 which is made of metal or any suitable heat conducting material and which is rotatably supported at its ends on a stationary pipe 3 centrally disposed with respect to the axis of the drum. This pipe 3 is preferably divided in two parts by a closure 4 at the central portion of the pipe. Near the ends of the drum the pipe is perforated as shown at 5 and 6 respectively. The stationary central pipe is supported in any suitable manner, such as by the supports 7. Secured to the stationary pipe are arms 8 which bear at their extremities a scraper 9 whose edge is arranged in close proximity to the inner walls of the drier. On the opposite side of the stationary pipe 3 are arms 10 which support a roller 11 journaled at its ends in the arms 10 and arranged to extend close to the inner walls of the drum as shown in the drawings.

Disposed underneath the drum is a hemispherical pan or vat 12, which is designed to be filled with water 13. As will be seen from the drawings the bottom portion of the vat is extended at 14 to provide room for a series of coils 15. The latter are connected at one end to a blower 16 which in turn is connected with a sterilizer 17. The opposite ends of the coils are connected by means of the pipe 18 with one end of the pipe 3.

The water in the vat 12 may be heated in any suitable manner as for instance by means of fire on the grate 19. A hinged cover 20 is provided for covering the pan or vat 12 and also inclosing the drum 1. The drum is provided with a drawer 21 by means of which it may be filled or emptied in the manner hereinafter described. The drum 1 may be rotated by any suitable means. In the present instance I have shown one end of the drum as projecting beyond the vat and being provided with a gear 22 arranged to be engaged by a gear 23 on a power shaft 24.

From the foregoing description of the various parts of the device the operation thereof may be readily understood. Buttermilk is placed within the drum and is heated by means of the water in the surrounding vat to a temperature of from 140° to 150° F. The casein will settle and the whey is siphoned off from the drum. The latter is now revolved by means of the power device in the hot water of the vat. The blower 16 forces air through the coils 15 thence into the pipe 10 and through the perforations 5 into the interior of the drum. This air, it will be understood, is drawn through the sterilizer 17 and is there sterilized. The passage of the warm sterilized air through the drum rapidly removes the moisture from the casein, this moisture laden air passing out through the perforations 6 into the hollow shaft 3 and thence out at the end thereof.

Where it is designed to make casein butter the drying process is continued until sufficient moisture has been removed to give the proper consistency, and butter and salt is added and thoroughly mixed with the casein, after which the mixture is cooled.

If dry casein is desired, the drying process is continued until the mass begins to harden. The scraper 9 keeps the mass from sticking to the inner walls of the drum, while the rollers 11 grind or powder the casein so that when it is thoroughly dried, it may be removed from the drum in a powdered condition.

Obviously the scraper and the roller aid in the manufacture of the casein butter, since they tend to cause an agitation or mixing of the mass as the drum revolves. Furthermore, the presence of these devices within the drum, stirs up the mass therein and presents new surfaces to the stream of warm sterilized air, thus tending to hasten the process of removing the moisture from the casein.

I claim:

1. A casein drying apparatus comprising a rotatable cylindrical drum, means for rotating the drum about its central axis, a stationary pipe extending through the drum, a water vat disposed underneath the drum, means for heating the water vat, a coil disposed within the water vat, a sterilizer, a blower connected with the sterilizer on one side and with one end of the coil on the other, the opposite end of the coil being connected with the central shaft or pipe, said shaft communicating with the drum near the end thereof, and having a closure between the communicating points.

2. A casein drying apparatus comprising a rotatable cylindrical drum, means for rotating the drum about its central axis, a stationary pipe extending through the drum, a water vat disposed underneath the drum, means for heating the water vat, a coil disposed within the water vat, a sterilizer, a blower connected with the sterilizer at one side and with one end of the coil on the other, the opposite end of the coil being connected with the central shaft or pipe, said shaft communicating with the drum near the end thereof and having a closure between the communicating points, and a scraper carried by said stationary pipe, the edge of said scraper being in close proximity to the inner wall of the drum.

3. A casein drying apparatus comprising a rotatable cylindrical drum, means for rotating the drum about its central axis, a stationary pipe extending through the drum, a water vat disposed underneath the drum, means for heating the water vat, a coil disposed within the water vat, a sterilizer, a blower connected with the sterilizer at one side and with one end of the coil on the other, the opposite end of the coil being connected with the central shaft or pipe, said shaft communicating with the drum near the end thereof and having a closure between the communicating points, a scraper carried by said stationary pipe, the edge of said scraper being in close proximity to the inner wall of the drum, and a roller carried by the pipe and arranged to engage the inner wall of the drum.

4. In a casein drying apparatus, a rotatable, cylindrical, imperforate drum, a semi-cylindrical water bath for heating said drum, said water bath being disposed concentrically with respect to the drum, and being provided with an extension at its lower portion, a series of pipes disposed in said extension, one end of said pipes communicating with the interior of the drum, and the other end communicating with a source of sterilized air and means for forcing said sterilized air through said pipe and into the drum.

5. In a casein drying apparatus, a rotatable, cylindrical, imperforate drum, a semi-cylindrical water bath for heating said drum, said water bath being disposed concentrically with respect to the drum, a pipe for sterilized air communicating with the interior of the drum, said water bath being arranged to heat said pipe, and means for forcing air through the pipe and into the drum.

JULIUS F. DIETRICH.